United States Patent
Petzold et al.

(10) Patent No.: US 11,170,934 B2
(45) Date of Patent: Nov. 9, 2021

(54) BIFILAR LAYER-INSULATED MAGNETIC CORE AND METHOD FOR THE PRODUCTION OF A WOUND NANOCRYSTALLINE MAGNETIC CORE

(71) Applicant: Vacuumschmelze GmbH & Co. KG, Hanau (DE)

(72) Inventors: Jörg Petzold, Kahl (DE); Oliver Friedrich, Brachttal (DE); Volker Kleespies, Jossgrund (DE); Johannes Binkofski, Rodenbach (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 119 days.

(21) Appl. No.: 16/412,228

(22) Filed: May 14, 2019

(65) Prior Publication Data

US 2019/0355514 A1   Nov. 21, 2019

(30) Foreign Application Priority Data

May 15, 2018   (DE) .................... 10 2018 111 526.1

(51) Int. Cl.
*H01F 41/02*   (2006.01)
*H01F 1/147*   (2006.01)
(Continued)

(52) U.S. Cl.
CPC .......... *H01F 41/0213* (2013.01); *B32B 7/12* (2013.01); *B32B 15/08* (2013.01); *B32B 15/18* (2013.01); *B32B 37/12* (2013.01); *B32B 37/20* (2013.01); *B32B 38/0012* (2013.01); *C22C 38/02* (2013.01); *C22C 38/12* (2013.01); *C22C 38/16* (2013.01); *H01F 1/14766* (2013.01); *H01F 3/04* (2013.01); *H01F 27/25* (2013.01);
(Continued)

(58) Field of Classification Search
None
See application file for complete search history.

(56) References Cited

U.S. PATENT DOCUMENTS

| 4,558,297 A | 12/1985 | Shigeta et al. |
| 7,629,870 B2 * | 12/2009 | Reyal ............... H01F 27/245 336/233 |
| 2006/0132278 A1 | 6/2006 | Reyal |

FOREIGN PATENT DOCUMENTS

| DE | 60013402 T2 | 9/2005 |
| WO | 199118404 A1 | 11/1991 |

OTHER PUBLICATIONS

Molvik et al. "Induction Core Alloys for Heavy-Ion Intertial Fusion-Energy Accelerators" The American Physical Society, Accelerators and Beams, vol. 5, pp. 080401.1-080401.20 (2002).
(Continued)

*Primary Examiner* — Xiaowei Su
(74) *Attorney, Agent, or Firm* — Dickinson Wright PLLC (57) ABSTRACT

A method is provided for the production of a wound nanocrystalline magnetic core in which a nanocrystalline metal strip made of $(Fe_{1-a}M_a)_{100-x-y-z-\alpha-\beta}Cu_xSi_yB_zM'_\alpha X_\beta$ is prewound to form a first coil. An insulating foil is provided that is coated with an adhesive on at least one side. An adhesive is applied to the nanocrystalline metal strip to laminate the insulating foil onto the metal strip and thereby to stabilise the metal strip as it is wound off the coil. The laminated nanocrystalline metal strip and the insulating foil are bifilar wound to form a bifilar, layer-insulated coil.

19 Claims, 5 Drawing Sheets

(51) Int. Cl.
      *C22C 38/12*    (2006.01)
      *C22C 38/16*    (2006.01)
      *C22C 38/02*    (2006.01)
      *B32B 15/08*    (2006.01)
      *B32B 15/18*    (2006.01)
      *B32B 7/12*     (2006.01)
      *B32B 38/00*    (2006.01)
      *B32B 37/12*    (2006.01)
      *H01F 3/04*     (2006.01)
      *H01F 27/25*    (2006.01)
      *B32B 37/20*    (2006.01)
      *H01F 41/063*   (2016.01)

(52) U.S. Cl.
     CPC .... *H01F 41/0226* (2013.01); *B32B 2307/208* (2013.01); *C22C 2202/02* (2013.01); *H01F 41/063* (2016.01); *Y10T 428/325* (2015.01)

(56) References Cited

OTHER PUBLICATIONS

Smith et al. "Insulations for Metallic Glasses in Pulse Power Systems" IEEE, Transactions on Electron Devices, vol. 38, No. 4, pp. 750-757, Apr. 1991.

\* cited by examiner

BIFILAR LAYER-INSULATED MAGNETIC CORE AND METHOD FOR THE PRODUCTION OF A WOUND NANOCRYSTALLINE MAGNETIC CORE

CROSS-REFERENCE TO RELATED APPLICATIONS

This U.S. patent application claims priority to German patent application no. 10 2018 111 526.1, filed May 15, 2018, the entire contents of which are incorporated herein by reference for all purposes.

BACKGROUND

1. Technical Field

The invention relates to a bifilar layer-insulated magnetic core, in particular a bifilar layer-insulated nanocrystalline magnetic core, and to a method for the production of a wound nanocrystalline magnetic core.

2. Related Art

Pulse compression circuits that achieve particularly short and steep, high-performance current and voltage pulses are used in applications such as high-power lasers, radar technology, resonators and power supply units for particle accelerators for nuclear physics and also in plasma physics. Typical operating data are pulse flows of 10 ... 100 kA with pulse durations of 10 ns to 1 μs, peak outputs lying within a range of 0.1 to 10 GW. These operating data for pulse compression circuits produce result in typical magnetisation speeds of $dB/dt=0.01$ to 100 T/μsec. Low core remagnetisation losses for unipolar magnetisation pulses therefore become a materials requirement.

WO 91/18404 discloses magnetic cores made of amorphous metal strips with various insulating materials that can be used in various forms such as deposited oxides or polymer foil. The amorphous metal strip can be coated with an oxide that is deposited from a solution onto the metal strip and then heat-treated since the oxide is sufficiently stabile. In magnetic cores of this type, in which the amorphous strip is first coated and then heat-treated, the magnetic properties are good but the insulation is relatively poor. Alternatively, the amorphous metal strip can first be heat-treated in the form of a coil and then wound with a separate insulating foil made, for example, of polyester or polyimide. In magnetic cores of this type insulation is better but the magnetic properties are impaired.

WO 91/18404 discloses that a magnetic core made of amorphous strips with insulating layers made of sheet silicate paper (mica) represents a suitable compromise. This type of arrangement nevertheless has the disadvantage that the magnetic core has a relatively low fill factor since the mica paper is relatively thick compared to the thickness of the strip.

Consequently, improved magnetic cores that simultaneously have both good magnetic properties, good layer insulation and a higher fill factor are desirable.

SUMMARY

According to the invention this is achieved with the subject-matter of the independent claims. Advantageous developments are detailed in the dependent claims.

According to the invention a method is provided for the production of a wound nanocrystalline magnetic core in which a nanocrystalline metal strip is pre-wound to form a first coil. An insulating foil coated on at least one side with an adhesive is provided. The adhesive is applied to the nanocrystalline metal strip to laminate the insulating foil to the metal strip and so to stabilise the metal strip as it is wound off the coil. The laminated nanocrystalline metal strip and the insulating foil are bifilar wound to form a bifilar, layer-insulated coil.

The nanocrystalline metal strip can consist of
$(Fe_{1-a}M_a)_{100-x-y-z-\alpha-\beta}Cu_xSi_yB_zM'_\alpha X_\beta$,
where
$0 \leq a \leq 0.4$,
$0.1$ at. % $\leq x \leq 3$ at. %,
$0$ at. % $\leq y \leq 30$ at. %,
$0$ at. % $\leq z \leq 25$ at. %,
$0.1$ at. % $\leq \alpha \leq 30$ at. %,
$\beta \leq 5$ at. %,
M is Co and/or Ni,
M' is one or more elements from the group consisting of V, Nb, Ta, Mo, W, Zr, Hf, Ti, Cr and Mn, and X one or more from the group consisting of C, Ge and P, including less than 2 at. % of the customary impurities. at. % denote atomic percent.

Nanocrystalline metal strips, in particular nanocrystalline metal strips with this composition, are brittle and are not therefore usually wound to form magnetic cores in their nanocrystalline state since this is, firstly, difficult to achieve and, secondly, impairs the magnetic properties. According to the invention, the insulating foil is adhesively applied to the nanocrystalline strip immediately before the nanocrystalline strip is wound off the first coil and before it is treated further. The adhesively applied insulating foil thus stabilises the nanocrystalline metal strip as it is wound off the first coil. It has been found that a laminate of this type comprising the nanocrystalline metal strip and the adhesively applied insulating foil can successfully be automatically processed and can be wound to form a magnetic core. Owing to the adhesively applied insulating foil, this is a bifilar winding process in which the insulating foil can also act as layer insulation in the finished magnetic core.

In one embodiment the insulating foil is applied to the metal strip at a point at which the metal strip is mechanically supported by an underlying winding of the coil. This protects the metal strip in order to avoid breaks.

The insulating foil can be continuously adhesively applied to the metal strip. It is therefore possible to produce large magnetic cores and/or a plurality of magnetic cores from the amount of material on a pre-coil. The insulating foil can be provided in the form of a second coil and be laminated continuously onto the metal strip.

In one embodiment the insulating foil has a width that is equal to or greater than the width of the metal strip. A central longitudinal line of the insulating foil is aligned with a central longitudinal line of the nanocrystalline metal strip such that once the insulating foil has been laminated onto the metal strip the width of the metal strip is completely covered by the insulating foil. This arrangement ensures the insulation of the edges of the metal strip and insulation between successive windings. In some embodiments the insulating foil projects beyond the marginal edges on at least one side and preferably on both sides of the metal strip to ensure electrical insulation and to avoid electric flashovers at the strip edges.

The insulating foil can comprise a plastic foil. At least one side of the plastic foil can already be coated with the adhesive prior to provision. Alternatively, the plastic foil is provided uncoated and is not coated with the adhesive until the winding process immediately before it is combined with the nanocrystalline metal strip. The plastic foil can, for example, be coated with the adhesive by means of spraying, spreading or rolling.

In one embodiment, the insulating foil is provided on a removable carrier strip located on the adhesive layer. The carrier strip is then removed from the adhesive and the adhesive-coated side of the foil is applied to the nanocrystalline metal strip, thereby creating the laminate comprising the insulating foil the and metal strip.

In one embodiment, after the adhesive layer of the insulating foil touches the nanocrystalline metal strip, pressure is applied to the insulating foil to laminate it onto the metal strip. The insulating foil can be pressed onto the metal strip by means of a spring-loaded downholder or a soft brush.

The bifilar winding can take place at a winding speed s where s≥1 m/min, preferably s≥5 m/min. In some embodiments the winding speed is increased step by step during the winding of a coil or magnetic core.

In one embodiment the relative positions of a centre line of the insulating foil and a centre line of the nanocrystalline metal strip are measured optically. If the predetermined maximum deviation is exceeded, the relative position of the insulating foil is corrected by a regulating mechanism. This improves the layer insulation in the entire bifilar coil.

In one embodiment the plastic foil is coated with adhesive on one side and the adhesive has a layer thickness of 1 µm to 10 µm, preferably 2 µm to 4 µm, and/or the plastic foil has a thickness of no more than 10 µm, preferably less than 6 µm, preferably less than 4 µm.

In one embodiment a plastic foil is selected that has a dielectric strength of at least 100V, preferably at least 500V and preferably at least 1000V. The adhesive used can be an acrylic adhesive and/or the plastic foil can comprise PET, polyimide or polyester.

In one embodiment the plastic foil has an average width $B_k$ and the nanocrystalline strip an average width $B_m$. Here $B_k > B_m$, the plastic foil having an overhang on both sides after bifilar winding. The overhang on each side can be between 0.4 and 0.6 mm at a width $B_m$ of 5 mm. This guarantees more reliable layer insulation.

In some embodiments the nanocrystalline metal strip has an average thickness $D_m$ of 14 µm to 25 µm and the insulating foil has an average thickness $D_k$ of 4 µm to 14 µm. The resulting bifilar layer-insulated magnetic core has a fill factor F, where F 50%.

In one embodiment the method also involves the production of the nanocrystalline metal strip. The production of the nanocrystalline metal strip can comprise the following:

providing an amorphous metal strip consisting of $(Fe_{1-a}M_a)_{100-x-y-z-\alpha-\beta}Cu_xSi_yB_zM'_\alpha X_\beta$, where $0 \le a \le 0.4$, 0.1 at. % $\le x \le 3$ at. %, 0 at. % $\le y \le 30$ at. %, 0 at. % $\le z \le 25$ at. %, 0.1 at. % $\le \alpha \le 30$ at. %, $\beta \le 5$ at. %, M is Co and/or Ni, M' is one or more of the elements in the group consisting of V, Nb, Ta, Mo, W, Zr, Hf, Ti, Cr and Mn, and X one or more of the group consisting of C, Ge and P, including less than 2 at. % of the customary impurities, and the heat treatment of the amorphous metal strip at a temperature of above 500° C. to produce a two-phase nanocrystalline structure.

This heat treatment can take place in a protective gas. During heat treatment, a longitudinal magnetic field, a transverse magnetic field or no external magnetic field can be applied to adjust the shape of the hysteresis loop.

According to the invention, a bifilar layer-insulated magnetic core is providing comprising a nanocrystalline metal strip consisting of $(Fe_{1-a}M_a)_{100-x-y-z-\alpha-\beta}Cu_xSi_yB_zM'_\alpha X_\beta$, where $0 \le a \le 0.4$, 0.1 at. % $\le x \le 3$ at. %, 0 at. % $\le y \le 30$ at. %, 0 at. % $\le z \le 25$ at. %, 0.1 at. % $\le \alpha \le 30$ at. %, $\beta \le 5$ at. %, M is Co and/or Ni, M' is one or more of the elements from a group consisting of V, Nb, Ta, Mo, W, Zr, Hf, Ti, Cr and Mn, and X one or more from a group consisting of C, Ge and P, including less than 2 at. % of the customary impurities, and an insulating foil. The insulating foil comprises a plastic foil that is coated on at least one side with an adhesive. The nanocrystalline metal strip and the insulating foil are bifilar wound.

The bifilar wound magnetic core can have a fill factor F of greater than 50%, greater than 60% or greater than 69% and can be produced using industrial-scale methods and machinery.

In one embodiment the adhesive comprises an acrylic adhesive and/or the plastic foil comprises PET, polyimide or polyester.

In one embodiment the plastic foil is coated on one side with adhesive and the adhesive has a layer thickness of 1 µm to 10 µm, preferably 2 µm to 4 µm.

In one embodiment the plastic foil has a dielectric strength of at least 100V, preferably at least 500V, preferably at least 1000V. This guarantees good layer insulation in the magnetic core.

The plastic foil can have a thickness of no more than 10 µm, preferably less than 6 µm, preferably less than 4 µm.

In one embodiment the plastic foil has a width $B_k$ and the nanocrystalline strip has a width $B_m$, where $B_k > B_m$, and the plastic foil has an overhang on both sides. At a width $B_m \ge 5$ mm the overhang on each side can be between 0.4 and 0.6 mm. This guarantees more reliable insulation of the marginal edges.

In one embodiment the nanocrystalline metal strip has an average thickness $D_m$ of 14 µm to 25 µm, the insulating foil an average thickness $D_k$ of 4 µm to 14 µm and the bifilar layer-insulated magnetic core a fill factor F, where F≥50%, preferably ≥60%, preferably ≥69%.

In one embodiment the bifilar layer-insulated magnetic core has a rectangular loop with a remanence ratio $B_r/B_s$, where $B_r/B_s > 65\%$, preferably >85%, preferably >95%, or a circular loop with a remanence ratio of $B_r/B_s \ge 50\%$, or a flat loop with a remanence ratio of $B_r/B_s < 50\%$.

In one embodiment the magnetic core has pulse losses of less than 3000 J/m³ at unipolar magnetisation speeds of dB/dt≥10 T/µsec. This magnetic core is particularly suitable for applications such as pulse compression circuits with particularly short and steep current and voltage pulses and very high performances.

An impulse transformer is also provided with one magnetic core according to any of the preceding embodiments.

A single- or multi-stage pulse compression circuit is also provided having one or more magnetic cores that are produced according to any of the preceding embodiments and operate as saturable chokes.

BRIEF DESCRIPTION OF THE DRAWINGS

The invention is explained in greater detail below with reference to the drawings, embodiments and examples.

DETAILED DESCRIPTION OF EXAMPLE EMBODIMENTS

According to the invention a method is provided for the industrial-scale production of wound, low-loss nanocrystalline magnetic cores with foil insulation for layer voltages of up to 100V, preferably 500V, preferably 1000V, and high fill factors of more than 50%. The following alloy system, known as VITROPERM or FINEMET, is based on the resulting cores:

$(Fe_{1-a}M_a)_{100-x-y-z-\alpha-\beta}Cu_xSi_yB_zM'_\alpha X_\beta$

Here $M_a$=Co and/or Ni; where
$0 \leq a \leq 0.4$,
$0.1 \leq x \leq 3$ at. %,
$0 \leq y \leq 30$ at. %,
$0 \leq z \leq 25$ at. %,
$0.1 \leq \alpha \leq 30$ at. %,
$\beta \leq 5$ at. %,
and
M'=V, Nb, Ta, Mo W, Zr, Hf, Ti, Cr, Mn
X=C, Ge, P and customary impurities of less than 2 at. %.

A condition for the insulation system to be introduced is that the hysteresis properties of the cores to be produced are not damaged. As nanocrystalline metal strips such as VITROPERM and FINEMET are brittle, the winding of such nanocrystalline strips in industrial-scale production is inherently difficult. A further aggravating problem is the fact that winding can also impair magnetic properties, in particular hysteresis properties, and this must be avoided.

According to the invention, a machine and a winding method are provided in which the nanocrystalline strip, severely embrittled by the heat treatment at the start of the winding process, is stabilised by the adhesive application of an insulating foil to protect against cracks and breaks. This insulating foil also serves as layer insulation in the finished magnetic core.

Figure 1:
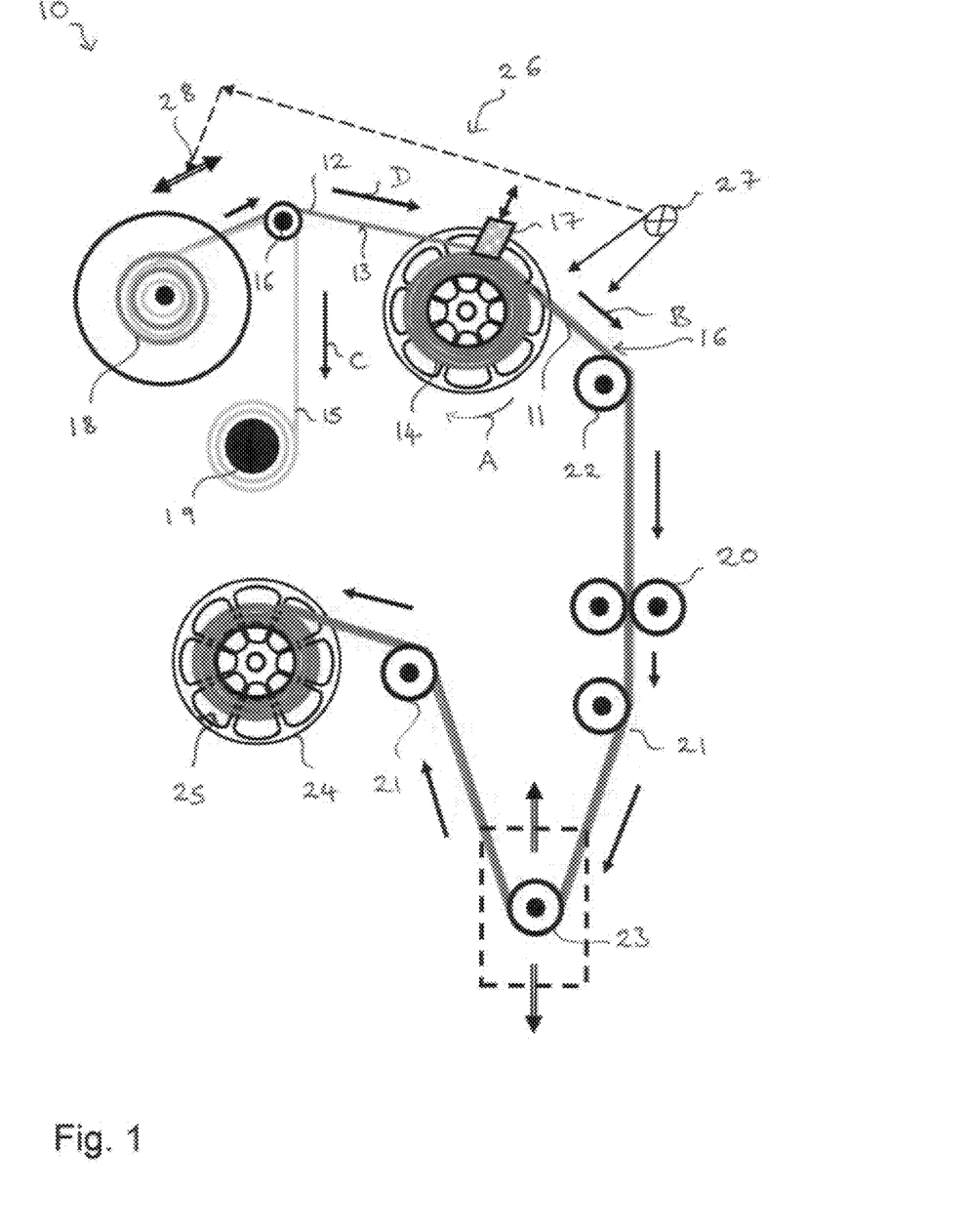
FIG. 1 shows a schematic overall view of a technical device for the bifilar winding of magnetic cores from nanocrystalline metal strip together with an insulating foil that is adhesive on one side.

FIG. 1 shows a schematic view of a machine 10 for the bifilar winding of brittle soft-magnetic strips 11 together with thin self-adhesive insulating foils 12.

Figure 2:
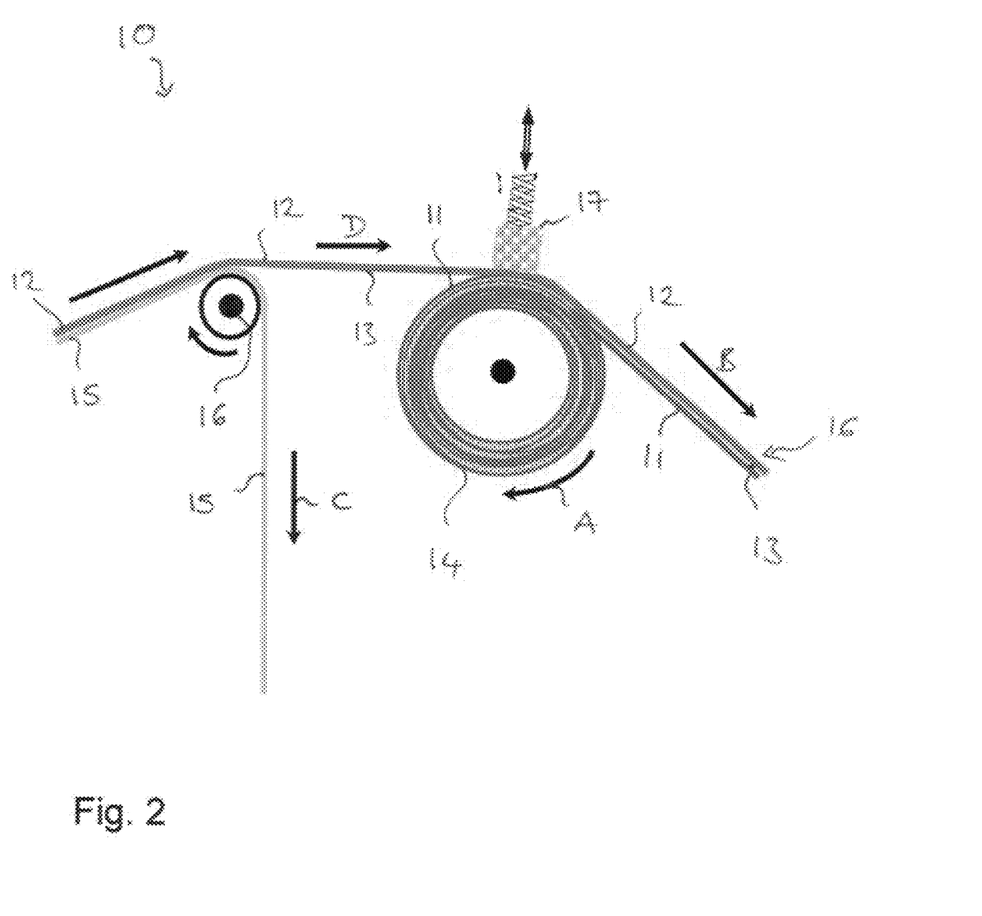
FIG. 2 shows a schematic view of the lamination of a nanocrystalline soft magnetic metal strip with the insulating foil that is coated with adhesive on one side.

FIG. 2 shows an enlarged schematic view of the machine 10 and in particular the lamination of a metal strip 11, in particular of a nanocrystalline soft-magnetic metal strip 11 having an insulating foil 12 that is coated on at least one side with adhesive 13.

The nanocrystalline soft-magnetic metal strip 11 is provided as a feed spool or coil 14, which is rotated in arrow direction A to wind the strip 11 off the feed spool or coil 14 in arrow direction B. The nanocrystalline soft-magnetic metal strip is already heat-treated and can have a F, R or Z loop. The insulating foil 12 is also provided as a feed coil 18. In the arrangement illustrated, the insulating foil 12 is provided on a carrier strip 15 that is removed from the insulating foil 12 to expose the adhesive 13. The machine 10 has a deflection or guide roller 16 that serves to divert the carrier strip removed from the insulating foil 12 in arrow direction C and to wind it onto a reel 19. The insulating foil 12 is guided in arrow direction D in the direction of and to the feed coil 14, and the underside of the insulating foil 12 on which the adhesive 13 is arranged is laminated onto the metal strip 11. In particular, the point at which the insulating foil 12 is applied to the metal strip 11 is located on the topmost layer of the feed coil 14 and directly on the feed coil 14. Not until the insulating foil 12 has been applied to the topmost layer of the metal strip 11 of the feed coil 14, is the metal strip 11 wound off the feed coil 14 in the arrow direction B in the form of a bifilar laminate 16 comprising the nanocrystalline metal strip 11 and the insulating foil 12. Accordingly, when the nanocrystalline metal strip 11 is wound off the feed coil 14 and subsequently passes through the machine 10 it has already been stabilised by the insulating foil 12.

The production of the laminate 16 serves not only to mechanically stabilise the brittle nanocrystalline metal strip 11, it also forms an insulating layer 12 on the surface that serves as layer insulation in the magnetic core. The mechanically stabilised composite structure or laminate 16 comprising the plastic foil 12, the adhesive layer 13 and the nanocrystalline strip 11 thus produced is then wound off the feed coil 14 and can subsequently be wound in its bifilar state together via various deflection rollers 21, 22 and regulating mechanisms 23 to form the foil-insulated core 25.

In one embodiment the upper side of the insulating foil 12 is pressed onto the topmost layer of the feed coil 14 to support the laminating process and to adhesively apply the insulating foil 12 to the metal strip 11 evenly and without bubbles. This can be effected by means of a cushioned downholder 17 or a soft brush, for example. To this end the insulating foil 12 is pressed onto the topmost layer of the feed coil 14 while this pressure point is still on the feed coil 14 and is thus supported by the layers of the feed coil 14 beneath it.

The insulating foil 12 can be a thin plastic foil made of Hostaphan, polyimide or polyester coated on one side with an acrylic adhesive, for example. The carrier strip 15 serves to protect the adhesive layer 13.

To achieve high fill factors of at least >50%, preferably >60%, preferably >69%, the insulating foils 12 used should be particularly thin but nevertheless processing-stable as well as having the necessary dielectric strength of at least 100V, preferably 500V, preferably 1000V. In testing compared to foils made of polyimide, polypropylene and PVD, foils made of PET (polyethylene terephthalate, such as the foils sold under the trade names Hostaphan® and Mylar®) in particular with a coating of acrylic adhesive have proved particularly suitable owing to their particular mechanical stability.

The insulating foil 12 can be provided as a feed roller 18. The insulating foil 12 can be a matt black insulating foil made of polyethylene terephthalate (PET) that is adhesive on one side and coated with acrylate adhesive (z. B. TESA 7908; overall thickness 8 μm) and can be provided on a removable carrier foil 15 made of plastic or paper.

To achieve high core fill factors, every effort should be made to use foil thicknesses of 4 μm or less even though they quickly reach the stability limit necessary for the industrial winding process. Foil strengths of greater than 10 μm and an adhesive layer of 5 μm, for example, are too thick to achieve the desired fill factor of at least 50%. A foil thickness of 5 to 8 μm with an adhesive layer of 2 to 4 μm has proved to be a good compromise between reliable processability and sufficient fill factor of the foil-insulated core. A currently preferred combination is a foil strength of 6 μm and an acrylic adhesive coating on one side with a layer thickness of 2 μm. Here the dielectric strength in commercially available foils (e.g. Tesa 7908) can reach up to 1000V.

To avoid electric short circuits or flashovers at the strip edges, the insulating foil 12 is preferably no narrower than the soft-magnetic nanocrystalline strip 11. An overhang on both sides of the insulating foil of 0.2 mm to 1 mm is better and more reliable. An overhang on both sides of 0.4 to 0.6 mm has proved suitable as the preferred compromise between electrical edge insulation and further processability of the core and the insulating foil 12 should therefore typically be 1 mm wider than the nanocrystalline soft-magnetic strip 11.

In the winding process it is therefore advisable that the centre lines of the insulating foil 12 and the nanocrystalline strip 11 are aligned during adhesion. An insulating foil 12 coloured black, for example, proves very favourable for the optically controlled alignment of the two strips relative to one another. Other colours that provide a contrast to the metal strip 11 are also well suited.

Once the laminate has been wound off the feed coil 14, it is guided, via pressure rollers 20, deflection rollers 21, 22 and a vertical dancer 23 to regulate the running of strip, to the drive roller 24 on which the laminate is wound to form a magnetic core 25. The winding speed is typically equal to or greater than 5 m/min.

In one embodiment the machine has optical position detection means 26 to position the self-adhesive insulating foil 12 centrally in relation to the nanocrystalline strip 11. The position of the insulating foil 12 on the nanocrystalline strip 11 is measured by a device 27 located downstream of the feed coil 14. This information is used by the regulator 28 to adjust the position of the insulating foil 12 in relation to the metal strip 11. For example, the central longitudinal line of the insulating foil 12 is aligned with the central longitudinal line of the topmost layer of the metal strip 11 on the feed coil 14 so that the metal strip 11 is completely covered by the insulating foil 12, thereby creating an identical edge overhang of the insulating foil 12 on both sides in respect of the nanocrystalline metal strip 11.

Depending on the intended use, the cores 25, bifilar wound as described above, can be encapsulated in metal or plastic housings. Other possibilities for the mechanical stabilisation of the magnetic core 25 are, for example, the surface application of a thin layer of a two-component epoxide adhesive system and the electrostatic application of a fluidised bed coating made of epoxy powder. In all cases it must be ensured that the strip layers of the cores are not over-tensioned and that the edge overhang of the insulating foil 12 is not damaged.

It should be noted that the bifilar insulation method developed here for switching and pulse transformer cores made of brittle nanocrystalline strip can also be used in a similar manner on cores made of less brittle pre-tempered amorphous Fe- and Co-based materials and also under certain conditions to crystalline cores made of ductile FeSi, NiFe or CoFe strip.

Pulse losses were assessed by discharging high voltage condensers with a total capacity of 52 nF and 660 nF through the core, which had previously been switched to negative remanence with a DC signal, thereby suddenly driving it far into positive saturation. The resulting losses are determined by oscilloscope measurement of the discharge current flowing through a primary winding. Using this signal the time-integral of the voltage measured at the same time at a secondary winding is plotted constantly and the dynamic hysteresis loop is finally produced after resetting to negative remanence. The area of the resulting hysteresis loop described by (1) or (1a) then represents the lost energy $V_P$ of the core:

$$V_P = \oint H dB \quad (1)$$

With $H(t) = \frac{I(t)}{l_{Fe}} \cdot N_1$ and $\frac{dB}{dt} = \frac{1}{A_{Fe} \cdot N_2} \cdot U(t)$ following from (1)

$$V_P = \frac{N_1}{l_{Fe} \cdot A_{Fe} \cdot N_2} \oint I(t) \cdot U(t) dt \quad (1a)$$

$l_{Fe}$=magnetic path length of the magnetic core, $A_{Fe}$=magnetic cross section of the magnetic core, $N_1$=number of primary windings, N2=number of secondary windings.

Alternatively, a suitable pulse generator can also be used to magnetise the core. For the measurements based on the embodiments set out below, a pulse flow generator was used in addition to the simple condenser discharge. The exciter signals used were unipolar rectangular current pulses. The variation in the magnetisation rate dB/dt was achieved by varying the pulse height at a constant rise time. The core was reset to negative remanence during pulse pauses by means of an additional winding with which a permanent DC field of strength H=0.2 A/cm was generated, the field direction being opposite to the rectangular pulses. The exciter and reset signals were decoupled by a cut-off choke that was connected in series to the additional winding.

Embodiments

Example 1

According to the Invention

Figure 3:
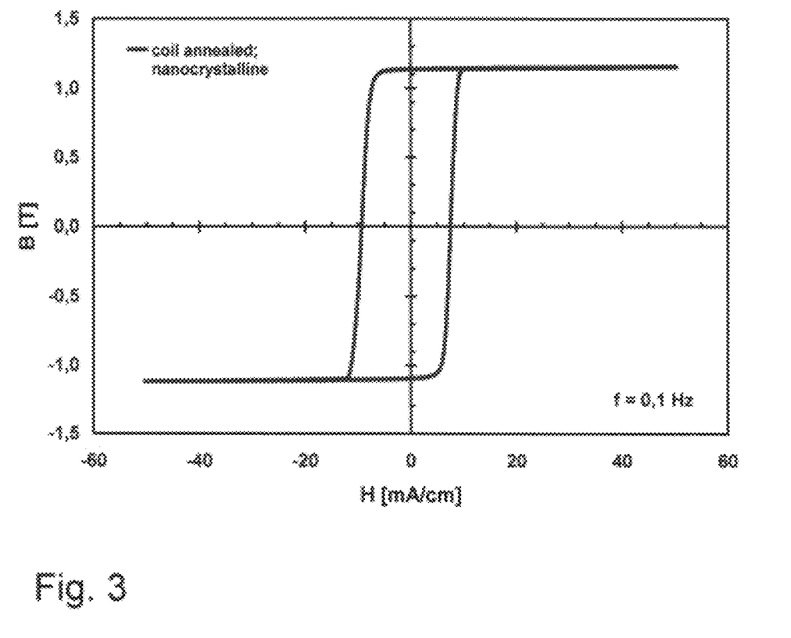
FIG. 3 shows a quasi-static hysteresis loop of the nanocrystalline strip annealed as a coil in a longitudinal field.

An amorphous strip of composition $Fe_R Cu_1 Nb_3 Si_{15,6} B_{6,8}$ was cast on an industrial scale using melt spinning technology to a width of 25 mm. The thickness measured locally by tactile measurement was 19 to 23 μm. Two comparable coils with an internal diameter of $D_i$=11.5 cm and an external diameter of $D_a$=20 cm were wound from part of the strip. The first coil was annealed in high-purity $H_2$-protective gas for 60 min at 575° C. to set the nanocrystalline structure. The longitudinal anisotropy necessary for the rectangular loop (Z loop) was set by means of a magnetomotive force of 500 A*turn applied throughout the duration of the heat treatment (corresponding to a longitudinal field strength of H≈10 A/cm) parallel to the longitudinal direction of the wound strip. After cooling in the protective gas and removal from the furnace, the rectangular loop illustrated in FIG. 3 was determined by quasistatic measurement at the coil, the remagnetisation speed being 0.1 Hz. The remanence $B_R$ to saturation $B_S$ ratio from the loop was $B_R/B_S$≈99% and the coercive field strength $H_C \approx 8.4$ mA/cm. Maximum permeability at $H(\mu_{max})=5.4$ mA/cm was $\mu_{max} \approx 1.64 \cdot 10^6$.

The nanocrystalline strip was then wound in the manner described on the device illustrated in FIGS. 1 and 2 to form a foil-insulated toroidal core with the dimensions 136×81×25 [mm³] without breaks or cracks. Initially 5 m/min, the winding speed was increased step by step during the winding process to 12 m/min. An insulating foil provided by Tesa (type 7908) was used to insulate against the high layer voltage occurring under fast pulse magnetisation. This consisted of a PET film with a thickness of 6 μm with a 2 μm thick layer of acrylic adhesive applied to one side. The resulting total thickness was therefore approx. 8 μm. The manufacturer specifies the dielectric strength of the foil, which defines the maximum permissible layer voltage in the core $U_L$, at 1000V. On delivery, the removable protective foil on the adhesive layer had a thickness of approx. 50 μm. The width of the insulating foil was 26 mm. There was therefore an overhang on each side of the adhesively applied metal strip of 0.5 mm. The fill factor of the foil-insulated coil determined by weight and circometry was 61%.

Figure 4:
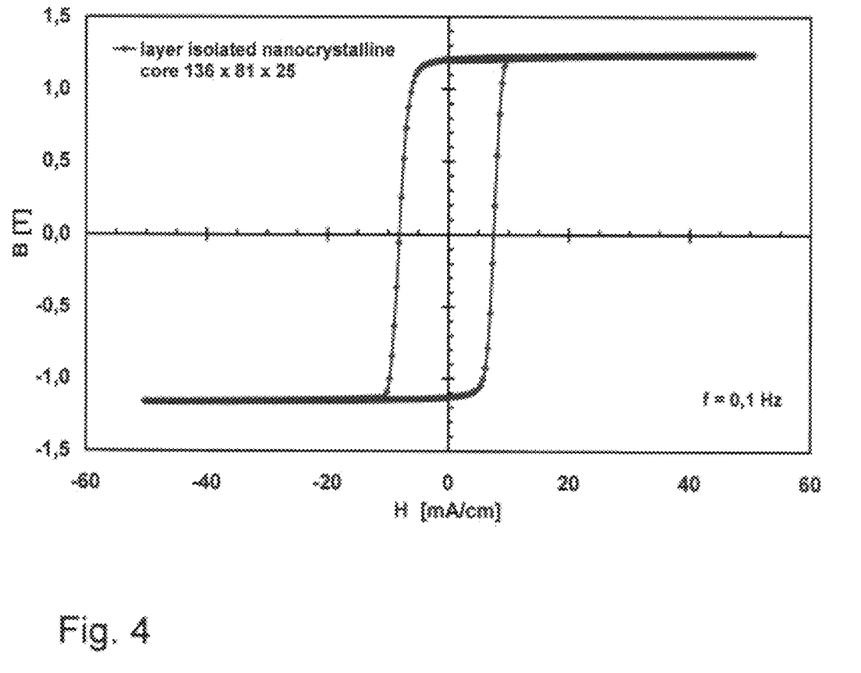
FIG. 4 shows a quasi-static rectangular loop of a foil-insulated nanocrystalline toroidal core.

The magnetic characterisation of the foil-insulated core was carried out by measuring the quasistatic hysteresis loop illustrated in FIG. 4 at 0.1 Hz. FIG. 4 shows a graph of a quasistatic rectangular loop of a foil-insulated nanocrystalline toroidal core with dimensions of 136×81×25 mm³ and an insulating foil made of PET (Hostaphan, 6 μm) coated on one side with acrylic adhesive (2 μm). The remanence ratio at $B_R/B_S \approx 97.5\%$ the coercive field strength at $H_C \approx 7.81$ mA/cm. The maximum permeability prevailing at $H(\mu_{max})=5.4$ mA/cm qA 1, 72*10⁶. These slight changes in relation to the wound strip are caused by magnetomechanical influences due to the applied insulating foil but play no negative role in the application.

Figure 5:
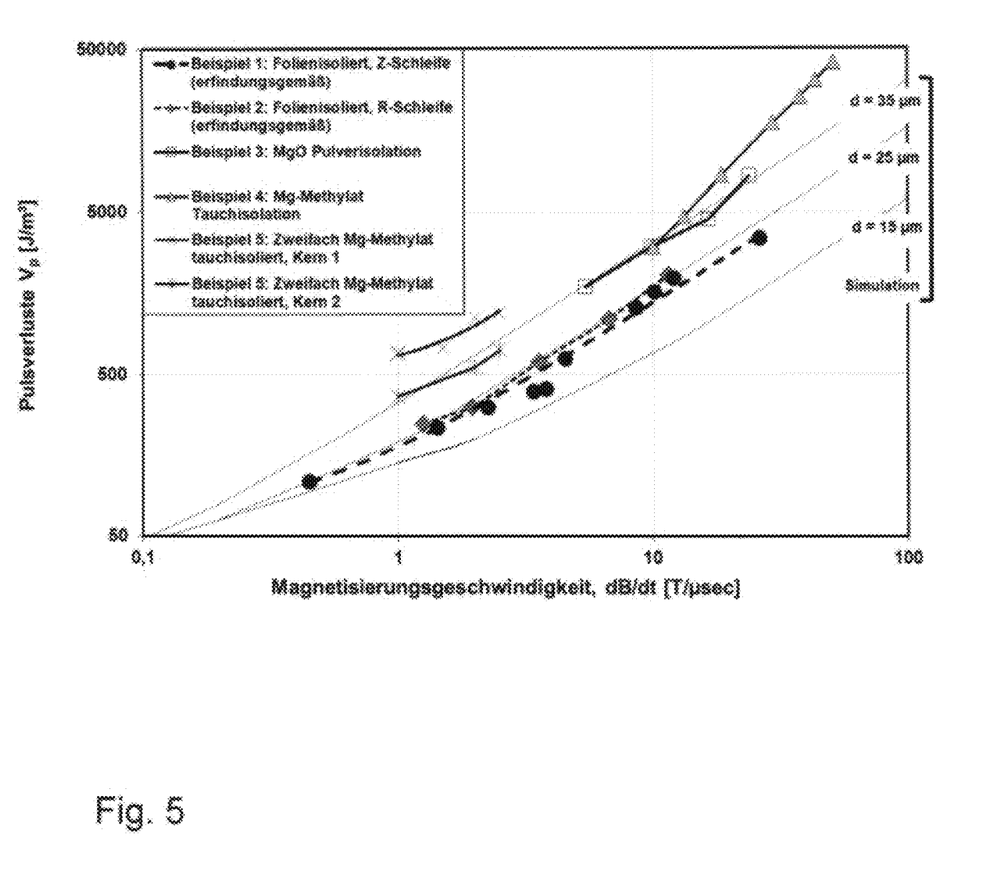
FIG. 5 shows pulse losses of the nanocrystalline cores from embodiments 1 to 5 dependent on magnetisation speed dB/dt.

The oscilloscope evaluation of the pulse losses $V_P$ under unipolar pulse magnetisation from negative remanence to positive saturation delivered the measurement values shown in Table 1 and FIG. 5. In FIG. 5 they follow the theoretical course proceeding from equations (2) and (3) as far as the maximum magnetisation speed reached of dB/dt=26.3 T/μsec.

According to the theory of fast dynamic magnetisation processes as disclosed in R. Wengerter, G. Herzer, F. Lenhard: Materials properties and pulsed magnetic characterization. Proc. of the Intern. Magnetic Pulse Compression Workshop, Granlibakken, Lake Tahoe, Lawrence Livermore National Laboratory, 1991, pp. 47-52 (cf. also R. Hilzinger, W. Rodewald: Magnetic Materials, ed. by VACUUM-SCHMELZE GmbH & Co. K G, Hanau, Germany, Publicis Publishing, Erlangen, 2013, pp. 365-366) the pulse losses $V_P$ of magnetic cores with rectangular hysteresis loops in the range of relatively slow magnetisation changes dB/dt≈0.01-1 T/μsec can be described by a model for rigid domain walls(2):

$$V_P = 14 \cdot \sqrt{B_S \cdot \frac{dB}{dt} \cdot \frac{\gamma \cdot L}{\rho}} \quad (2)$$

$B_S$=saturation induction, L=average domain width, ρ=specific electrical resistance, γ=specific domain wall energy with $\gamma = 4\sqrt{A \cdot K_U}$ where A=exchange constant and $K_U$=effective longitudinal anisotropy.

The losses according to (2) for a given magnetisation condition are determined exclusively using intrinsic parameters. In contrast, the range of fast magnetisation changes dB/dt≈1-100 T/μsec is better described by the model for sandwich domains (3), which also depends on the strip thickness d as a further parameter:

$$V_P = \frac{\frac{dB}{dt} \cdot d^2}{4 \cdot \rho} \cdot B_S + 1.893 \cdot \frac{\gamma \cdot L}{d^2} \quad (3)$$

While intrinsic material parameters A, L and ρ change only little within many amorphous and nanocrystalline alloy families in case of a variation in composition, pulse losses can be optimised via parameters $B_S$, $K_U$ and d by means of material selection and process management.

The pulse losses in the range of low magnetisation rates dB/dt≈0.01 . . . 1 T/μsec depend predominantly on specific wall energy γ and so on uniaxial longitudinal anisotropy $K_U$. In the range dB/dt=1 . . . 100 T/μsec, on the other hand, the product of quadratic strip thickness and magnetisation speed is decisive. At the same time, according to (3), at constant $K_U$ or γ values the losses increase over the wide range dB/dt≈1 . . . 100 T/μsec linearly with the saturation induction.

In the real material the uniaxial anisotropy $K_U$ (and so the wall energy γ) arising within a given time interval also depends on the saturation induction value $B_S$ at a given field heat treatment.

Equation (4) shows that the layer voltage occurring between the strip layers during dynamic magnetisation processes increases proportionally to the magnetisation speed dB/dt:

$$U_L = -h \cdot d \cdot \frac{dB}{dt} \quad (4)$$

h=core height or strip width; d=strip thickness.

Owing to equations (3) and (4), the increase in pulses losses $V_P$ at high magnetisation speeds is linear with the layer voltage $U_L$. For example, at a magnetisation speed of dB/dt=100 T/μsec a voltage of 50V occurs between two strips of width h=25 mm and thickness d=20 μm. With layer voltages of this type standard layer insulation materials such as MgO and $Al_2O_3$, for example, with a typical voltage stability of 1-5V are unsuitable.

The values for layer voltage $U_L$ calculated using equation (4) are included in Table 1. Owing to the strip width of 25 mm in this case they are comparatively high.

Figure 6:
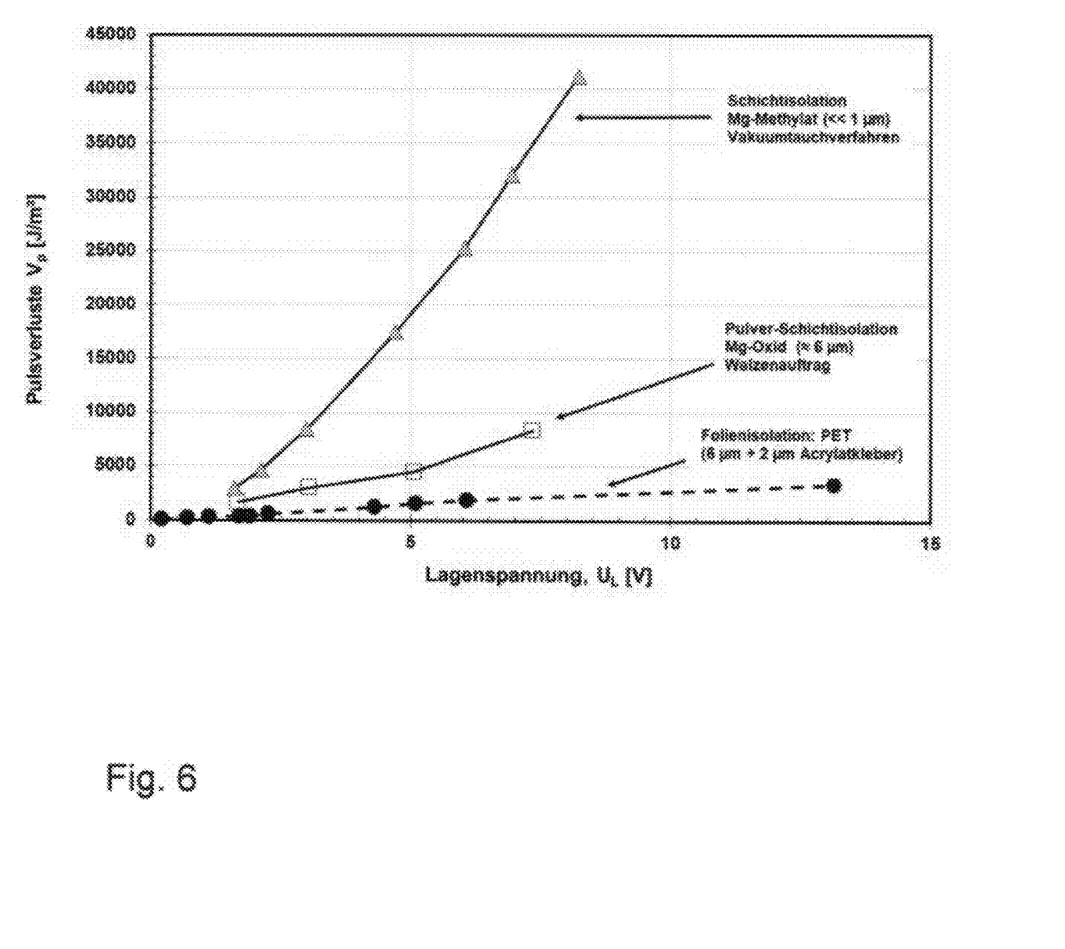
FIG. 6 shows pulse losses of the nanocrystalline cores from embodiments 1, 3 and 4 dependent on layer voltage $U_L$.

In FIG. 6 the losses $V_P$ exhibit almost linear behaviour up to the relatively high $U_L$ value of 13.15V, as confirmed by the completely stable insulation properties of the adhesive foil. There are no discontinuities due to exceeding the voltage stability leading to electric layer short circuits or punctures (breakthroughs).

TABLE 1

| dB/dt [T/μsec] | Vp [J/m³] | $U_L$ [V] |
| --- | --- | --- |
| 0.45 | 107.9 | 0.23 |
| 1.43 | 234.1 | 0.72 |
| 2.26 | 312.0 | 1.13 |
| 3.41 | 388.9 | 1.71 |
| 3.81 | 402.3 | 1.91 |
| 4.53 | 612.6 | 2.27 |
| 8.63 | 1263.5 | 4.31 |

TABLE 1-continued

| dB/dt [T/µsec] | Vp [J/m³] | U_L [V] |
|---|---|---|
| 10.21 | 1580.2 | 5.10 |
| 12.16 | 1912.4 | 6.08 |
| 26.30 | 3368.0 | 13.15 |

Table 1 shows pulse losses and layer voltages for the foil-insulated core according to the invention with Z loop as detailed in Example 1.

Example 2

According to the Invention

The second of the two reels or coils produced in Example 1 was annealed in a high-purity $H_2$ protective gas on a copper plate with a thickness of 10 mm completely field-free in a linear continuous furnace to set an R loop. The time taken to heat the coil from room temperature to the crystallisation temperature of $T_x=545°$ C. was 45 minutes. The coil was held at this temperature for 40 minutes to convert the material from the amorphous to the nanocrystalline state. The subsequent cooling phase to room temperature lasted one hour. The coil was then removed from the protective gas.

Magnetic characterisation of the coil following heat treatment showed:
Coercive field strength (quasistatic): $H_C$=9.6 mA/cm
Remanence ratio (quasistatic): $B_R/B_S$=77%
Maximum permeability of new curve at 50 Hz: $\mu_{max}$=521,800 at H=12.4 mA/cm.

The nanocrystalline strip was then bifilar wound as in Example 1 on the device illustrated in FIGS. 1 and 2 together with a self-adhesive PET foil strip with a width of 26 mm and a thickness of 6 µm+2 µm acrylic adhesive to form a foil-insulated core with the dimensions 136×81×25 [mm³]. The resulting fill factor was approx. 62%.

Magnetic characterisation of the foil-insulated core showed:
Coercive field strength (quasistatic): $H_C$=10.6 mA/cm
Remanence ratio (quasistatic): $B_R/B_S$=52%
Maximum permeability of new curve at 50 Hz: $\mu_{max}$=251,700 at H=15.4 mA/cm.

The winding speed set was initially 8 m/min and was increased during the course of the winding process to 15 m/min without the strip being torn off.

The clear deterioration in quasistatic properties can be ascribed to the fact that the magnetostriction in the strip was not completely offset due to the relatively low crystallisation temperature of $T_x=545°$ C. selected. At the very high permeability values prevailing here, the tensions occurring during the laminating and winding process therefore lead to low but still effective interference anisotropies and so to an observable deterioration in properties. Table 2 shows pulse losses and layer voltages of the foil-insulated core according to the invention with R loop from Example 2.

As shown by comparing Table 2 to Table 1 and indicated in FIG. 5, unlike the quasistatic properties, the pulse properties relevant here are completely insensitive to interfering technological influences of this type. At the same time, FIG. 5 shows that at the magnetisation speeds prevailing here the influence of the various hysteresis loops from Examples 1 and 2 on pulse losses is very low.

TABLE 2

| dB/dt [T/µsec] | Vp [J/m³] | U_L [V] |
|---|---|---|
| 1.25 | 250.6 | 0.63 |
| 1.95 | 313.6 | 0.98 |
| 3.57 | 594.7 | 1.79 |
| 6.75 | 1089.2 | 3.38 |
| 11.47 | 2016.1 | 5.74 |

This result is initially unexpected. However, since the product $(dB/dt)*d^2$ dominates in equation (5) in fast magnetisation processes, as magnetisation speed increases so the influence of loop shape and quality weakens. This would have resulted in similar pulse losses for dB/dt≥1 T/µsec if a transverse anisotropy and the resulting F loop had been induced in the band after heat treatment in the transverse field. Similarly, a further increase in magnetostriction due to reduced crystallisation temperatures of TX=500 . . . 520° C. would not have led to notable changes in pulse losses.

Example 3

Comparative Example

Approx. 4 kg of strip in the "as manufactured" state were removed from a batch of material with the composition $Fe_{75.2}Cu_{0.8}Nb_{2.8}Si_{13.4}B_{7.8}$ and a strip thickness of 19 to 21 µm and cut to a width of 15.4 mm using circular shears. For the layer insulation of the narrow strip, three parts by weight of MgO powder (grain size 5 µm) were mixed with one part by weight of cellulose methyl ether adhesive (Methocel K 100) and then slowly stirred into hot water until a thick emulsion formed. This was applied in a continuous process by roller to the strip surface such that after continuous drying at 105° C. an insulating layer of approx. 6 µm thickness was formed. The coated strip was wound on regulated winding machines to form a plurality of toroidal cores with the dimensions 78×42×15.4 [mm³]. The fill factors achieved varied between 53% and 60%. Heat treatment was carried out for 60 min at 560° C. in high-purity $H_2$ protective gas. To form the longitudinal anisotropy necessary for a rectangular loop, the cores were subjected to a static magnetic field with a strength of 8 A/cm parallel to the direction of the strip wound to form the core throughout the entire duration of the heat treatments. After cooling in the protective gas and removal from the furnace a quasi-static rectangular loop very similar to that illustrated in FIG. 4 was measured on a typical core.

Measurement of the pulse losses under unipolar magnetisation gave the measurement values indicated in Table 3 and FIGS. 5 and 6.

TABLE 3

| dB/dt [T/µsec] | Vp [J/m³] | U_L [V] |
|---|---|---|
| 5.43 | 1701.2 | 1.67 |
| 9.87 | 3009.3 | 3.04 |
| 16.44 | 4475.7 | 5.06 |
| 23.84 | 8315.4 | 7.34 |

Table 3 shows pulse losses and layer voltages of the powder-insulated core from Example 3.

Although this core was wound from a similar material as the cores in Examples 1 and 2 and subjected to the corresponding heat treatment, its pulse losses are clearly higher than those recorded in Examples 1 and 2. As shown in FIG. 5, for magnetisation speeds of between 5.43 T/μsec and 16.44 T/μsec they correspond to a simulated strip thickness of approx. 35 μm due to an insulating effect which, although constant, is lower than the foil insulation. Between 16.44 T/μsec and 23.84 T/μsec, however, there is a disproportionate increase in pulse losses that occurs due to the insulation effect, which deteriorates drastically as magnetisation speed increases.

The weaker insulating effect of the MgO powder coating is also shown clearly in FIG. 6, where this core has pulse losses several times higher than the foil-insulated core according to the invention at comparable layer voltage. Furthermore, the losses of the powder-coated core show a disproportionate increase after a quasi-linear initial area above $U_L$=5.06V. This occurs because the limit value for voltage stability is exceeded.

Example 4

Comparative Example

Approximately 1.5 kg of strip from the same charge as in embodiments 1 and 2 (local thickness 19 to 23 μm) was cut to a width of 8.0 mm using circular shears. The strip, rewound onto the coil after the cutting process, was coated with a solution of magnesium methylate (4 wt. % solids content) using the vacuum dipping method. The dipped strip coil was then dried for 2 h at 120° C. in a well ventilated warming cupboard. Toroidal coils with dimensions of 20×12.5×8 [mm³] were then wound from the coated strip on regulated automatic winding machines, achieving a fill factor of more than 78%. The cores were annealed in high-purity $H_2$-protective gas for 60 min at 575° C. To set the longitudinal anisotropy necessary for a rectangular loop, a longitudinal field of 8 A/cm was applied for the entire duration of the heat treatment, to which end the cores were stacked on a current-carrying bar. After cooling in the protective gas and removal from the furnace a quasistatic (0.1 Hz) hysteresis loop was measured at a plurality of cores, which was in all cases very similar to that in FIG. 3. The pulse losses were then measured on a typical core in the same manner as in the preceding examples (cf. Table 4 and FIG. 5).

Although at a given magnetisation speed the layer voltages are only 32% of those in Example 1 due to the small strip width of 8 mm, the losses in FIG. 5 are factors higher than those of the foil-insulated core.

TABLE 4

| dB/dt [T/μsec] | Vp [J/m³] | $U_L$ [V] |
|---|---|---|
| 10.07 | 2982.3 | 1.61 |
| 13.24 | 4639.4 | 2.12 |
| 18.65 | 8447.0 | 2.98 |
| 29.45 | 17461.0 | 4.71 |
| 37.73 | 25313.4 | 6.04 |
| 43.39 | 32097.4 | 6.94 |
| 51.39 | 41227.2 | 8.22 |

Table 4 shows pulse losses of the dip-insulated core of Example 4.

They no longer follow the course predicted by the theory for a given strip thickness but increase disproportionally strongly with magnetisation speed due to the systematic decline in insulation effect.

FIG. 6 shows in a corresponding manner that the losses of the single dip-insulated core at a given layer voltage are many times higher than those of the powder-coated or foil-insulated cores. In contrast to the foil-insulated core from Example 1, which exhibits the expected linear increase in losses due to the constant and stable insulating effect, the losses of the single dip-insulated core increase in a non-linear, parabola-like manner. This behaviour occurs because the voltage stability of the insulating layer is exceeded as the insulating effect declines.

5. Example

Comparative Example

Approximately 1.5 kg of strip from the same charge as in embodiment 1 (width 25 mm, local thickness 19 to 23 μm) were coated with a solution of magnesium methylate with a 4 wt. % solids content using the vacuum dipping process. The dipped strip coil was then dried at approx. 120° C. for 2 h in a well ventilated calibration furnace. The entire process was then repeated so that the strip was double coated. Two toroidal coils with dimensions of 78×42×25 [mm³] were then wound on regulated winding machines from the strip coated in this manner, achieving a fill factor of more than 70%. The cores were annealed in high-purity $H_2$-protective gas for 60 min at 575° C. The longitudinal anisotropy necessary for cores with rectangular loops was set by applying a longitudinal field of 8 A/cm for the entire duration of the heat treatment. To this end, the cores were strung on a current-carrying bar in the furnace. After cooling in the protective gas and removal from the furnace a quasistatic (0.1 Hz) hysteresis loop was measured on each of two cores, both being very similar to that in FIG. 4. The pulse losses on "Core 1" and "Core 2" were then measured in the same manner as in the preceding examples (cf. Table 5 and FIG. 5).

Although both cores were measured at relatively low magnetisation speeds of 1 to 2.5 T/μsec and therefore also exhibit low layer voltages, they have clearly higher losses that might have been expected given the strip thickness of 19 to 23 μm. While core 1 shows clearly excessive losses, the losses of core 2 are only half as high. The latter has a similar characteristic to the powder-coated core from Example 3. However, the losses are almost twice as high as those for the two foil-insulated cores.

TABLE 5

| dB/dt [T/μsec] | Core 1 Vp [J/m³] | Core 2 Vp [J/m³] | $U_L$ [V] |
|---|---|---|---|
| 1.00 | 671.9 | 365.5 | 0.50 |
| 1.50 | 724.6 | — | 0.75 |
| 2.00 | 1102.4 | 551.7 | 1.00 |
| 2.50 | 1187.0 | 699.0 | 1.25 |

Table 5 shows pulse losses of the two double dip-insulated cores from Example 5.

The invention claimed is:
1. A method for the production of a wound nanocrystalline magnetic core comprising:
   providing a nanocrystalline metal strip consisting of
   $(Fe_{1-a}M_a)_{100-x-y-z-\alpha-\beta}Cu_xSi_yB_zM'_\alpha X_\beta$,
   where
   $0 \le a \le 0.4$,
   $0.1 \le x \le 3$ at. %,

0≤y≤30 at. %,
0 at. % ≤z≤25 at. %,
0.1 at. % ≤α≤30 at. %,
β≤5 at. %,
M is Co and/or Ni,
M' is one or more elements from the group consisting of V, Nb, Ta, Mo, W, Zr, Hf, Ti, Cr and Mn,
X is one or more from the group consisting of C, Ge and P, including less than 2 at. % of customary impurities, the metal strip being pre-wound to form a coil,
providing an insulating foil that is coated on at least one side with an adhesive,
applying the adhesive to the nanocrystalline metal strip to laminate the insulating foil onto the metal strip and to stabilise the metal strip as it is wound off the coil,
bifilar winding the laminated nanocrystalline metal strip and the insulating foil to form a bifilar, layer-insulated coil,
wherein the insulating foil comprises a plastic foil,
wherein the plastic foil is free from adhesive on provision and is not coated with the adhesive until the winding process immediately before it is combined with the nanocrystalline metal strip.

2. A method according to claim 1, wherein the insulating foil is applied to the metal strip in a position in which the metal strip is mechanically supported by an underlying winding of the coil.

3. A method according to claim 1, wherein the insulating foil comprises a width that is equal to or greater than the width of the metal strip, and a central longitudinal line of the insulating foil is aligned with a central longitudinal line of the nanocrystalline metal strip so that after the lamination of the insulating foil onto the metal strip the width of the metal strip is completely covered by the insulating foil.

4. A method according to claim 1, wherein after the insulating foil with the adhesive layer has come into contact with the nanocrystalline metal strip the insulating foil is pressed onto the metal strip by means of a spring-loaded downholder or a soft brush to laminate it onto the metal strip.

5. A method according to claim 1, wherein the nanocrystalline metal strip and the insulating foil are wound to form a bifilar, layer-insulated magnetic core.

6. A method according to claim 1, wherein the plastic foil is coated on one side with adhesive and the adhesive having a layer thickness of 1 μm to 10 μm and/or the plastic foil has a thickness of no more than 10 μm.

7. A method according to claim 1, wherein the plastic foil has a dielectric strength of at least 100V.

8. A method according to claim 1, wherein the adhesive comprises an acrylic adhesive and/or the plastic foil comprises PET, polyimide or polyester.

9. A method for the production of a wound nanocrystalline magnetic core comprising:
providing a nanocrystalline metal strip consisting of
$(Fe_{1-a}M_a)_{100-x-y-z-\alpha-\beta}Cu_xSi_yB_zM'_\alpha X_\beta$,
where
0≤a≤0.4,
0.1≤x≤3 at. %,
0≤y≤30 at. %,
0 at. % ≤z≤25 at. %,
0.1 at. % ≤α≤30 at. %,
β≤5 at. %,
M is Co and/or Ni,
M' is one or more elements from the group consisting of V, Nb, Ta, Mo, W, Zr, Hf, Ti, Cr and Mn,
X is one or more from the group consisting of C, Ge and P, including less than 2 at. % of customary impurities, the metal strip being pre-wound to form a coil,
providing an insulating foil that is coated on at least one side with an adhesive,
applying the adhesive to the nanocrystalline metal strip to laminate the insulating foil onto the metal strip and to stabilise the metal strip as it is wound off the coil,
bifilar winding the laminated nanocrystalline metal strip and the insulating foil to form a bifilar, layer-insulated coil,
wherein the insulating foil is provided on a removable carrier strip, the carrier strip is removed from the adhesive and the adhesive is applied to the nanocrystalline metal strip to laminate the insulating foil onto the metal strip.

10. A method according to claim 9, wherein the insulating foil is provided in the form of a second coil and continuously laminated onto the metal strip.

11. A method according to claim 9, wherein the nanocrystalline metal strip has an average thickness $D_m$ of 14 μm to 25 μm and the insulating foil has an average thickness $D_k$ of 4 μm to 14 μm, and the bifilar layer-insulated magnetic core has a fill factor F, where F ≥50%.

12. A method according to claim 9, the method also comprising the following to produce the nanocrystalline metal strip:
providing an amorphous metal strip consisting of
$(Fe_{1-a}M_a)_{100-x-y-z-\alpha-\beta}Cu_xSi_yB_zM'_\alpha X_\beta$,
where
0≤a≤0.4,
0.1≤x≤3 at. %
0≤y≤30 at. %,
0 at. % ≤z≤25 at. %,
0.1 at. % ≤α≤30 at. %,
β≤5 at. %,
M is Co and/or Ni,
M' is one or more elements from the group consisting of V, Nb, Ta, Mo, W, Zr, Hf, Ti, Cr and Mn, and
X is one or more from the group consisting of C, Ge and P, including less than 2 at. % of the customary impurities, and
heat treating the amorphous metal strip at a temperature of above 500° C. to produce a nanocrystalline two-phase structure.

13. A method according to claim 12, wherein the heat treatment takes place in a protective gas.

14. A method according to claim 12, wherein a longitudinal magnetic field, a transverse magnetic field or no external magnetic field is applied during heat treatment.

15. A method for the production of a wound nanocrystalline magnetic core comprising:
providing a nanocrystalline metal strip consisting of
$(Fe_{1-a}M_a)_{100-x-y-z-\alpha-\beta}Cu_xSi_yB_zM'_\alpha X_\beta$,
where
0≤a≤0.4,
0.1≤x≤3 at. %,
0≤y≤30 at. %,
0 at. % ≤z≤25 at. %,
0.1 at. % ≤α≤30 at. %,
β≤5 at. %,
M is Co and/or Ni,
M' is one or more elements from the group consisting of V, Nb, Ta, Mo, W, Zr, Hf, Ti, Cr and Mn, X is one or more from the group consisting of C, Ge and P, including less than 2 at. % of customary impurities, the metal strip being pre-wound to form a coil, providing an insulating foil that is coated on at least one side with an adhesive, applying the adhesive to the nanocrystalline metal strip to laminate the insulating foil onto the metal strip and to stabilise the metal strip as it is wound off the coil, bifilar winding the laminated nanocrystalline metal strip and the insulating foil to form a bifilar, layer-insulated coil, wherein the bifilar winding takes place at a winding speed s where s ≥1 m/min.

16. A method according to claim 15, wherein the winding speed is increased in step by step.

17. A method for the production of a wound nanocrystalline magnetic core comprising:

providing a nanocrystalline metal strip consisting of $(Fe_{1-a}M_a)_{100-x-y-z-\alpha-\beta}Cu_xSi_yB_zM'_\alpha X_\beta$, where $0 \leq a \leq 0.4$, $0.1 \leq x \leq 3$ at. %, $0 \leq y \leq 30$ at. %, 0 at. % $\leq z \leq 25$ at. %, 0.1 at. % $\leq \alpha \leq 30$ at. %, $\beta \leq 5$ at. %, M is Co and/or Ni, M' is one or more elements from the group consisting of V, Nb, Ta, Mo, W, Zr, Hf, Ti, Cr and Mn, X is one or more from the group consisting of C, Ge and P, including less than 2 at. % of customary impurities, the metal strip being pre-wound to form a coil, providing an insulating foil that is coated on at least one side with an adhesive, applying the adhesive to the nanocrystalline metal strip to laminate the insulating foil onto the metal strip and to stabilise the metal strip as it is wound off the coil, bifilar winding the laminated nanocrystalline metal strip and the insulating foil to form a bifilar, layer-insulated coil, wherein the relative positions of a central line of the insulating foil and a central line of the nanocrystalline metal strip are measured optically and if the predetermined maximum deviation is exceeded the relative position of the insulating foil is corrected by a regulating mechanism.

18. A method for the production of a wound nanocrystalline magnetic core comprising:

providing a nanocrystalline metal strip consisting of $(Fe_{1-a}M_a)_{100-x-y-z-\alpha-\beta}Cu_xSi_yB_zM'_\alpha X_\beta$, where $0 \leq a \leq 0.4$, $0.1 \leq x \leq 3$ at. %

$0 \leq y \leq 30$ at. %, 0 at. % $\leq z \leq 25$ at. %, 0.1 at. % $\leq \alpha \leq 30$ at. %, $\beta \leq 5$ at. %, M is Co and/or Ni, M' is one or more elements from the group consisting of V, Nb, Ta, Mo, W, Zr, Hf, Ti, Cr and Mn, X is one or more from the group consisting of C, Ge and P, including less than 2 at. % of customary impurities, the metal strip being pre-wound to form a coil, providing an insulating foil that is coated on at least one side with an adhesive, applying the adhesive to the nanocrystalline metal strip to laminate the insulating foil onto the metal strip and to stabilise the metal strip as it is wound off the coil, bifilar winding the laminated nanocrystalline metal strip and the insulating foil to form a bifilar, layer-insulated coil, wherein the insulating foil comprises a plastic foil, and wherein the plastic foil has an average width Bk and the nanocrystalline strip has an average width $B_m$, where $B_k > B_m$, and the plastic foil has an overhang on both sides after bifilar winding.

19. A method according to claim 18, wherein the overhang on each side is between 0.4 and 0.6 mm at a width $B_m$ of >5 mm.

* * * * *